United States Patent [19]

Walker

[11] Patent Number: 5,591,381

[45] Date of Patent: Jan. 7, 1997

[54] CORROSION INHIBITING COMPOSITIONS AND METHODS

[75] Inventor: Michael L. Walker, Duncan, Okla.

[73] Assignee: Halliburton Company, Duncan, Okla.

[21] Appl. No.: 224,102

[22] Filed: Apr. 6, 1994

Related U.S. Application Data

[63] Continuation of Ser. No. 965,106, Oct. 22, 1992, abandoned.

[51] Int. Cl.$^6$ ..................................................... C23F 11/18
[52] U.S. Cl. ................ 252/389.54; 252/392; 106/14.17; 106/14.44; 422/16; 422/19
[58] Field of Search ............................... 252/389.54, 392; 106/14.17, 14.44; 422/16, 19

[56] References Cited

U.S. PATENT DOCUMENTS

| | | | |
|---|---|---|---|
| 1,915,148 | 6/1933 | Berliner et al. | |
| 1,956,266 | 4/1934 | Berliner et al. | 252/5 |
| 3,077,454 | 2/1963 | Monroe et al. | 252/148 |
| 3,094,490 | 6/1963 | Gardner et al. | 252/149 |
| 3,634,270 | 1/1972 | Engle et al. | 252/149 |
| 3,896,044 | 7/1975 | Mago et al. | 252/192 |
| 3,932,296 | 1/1976 | Byth | 252/148 |
| 4,420,337 | 12/1983 | Oakes et al. | 106/14.15 |
| 4,446,119 | 5/1984 | DuPart et al. | 423/228 |
| 4,493,775 | 1/1985 | Coffey et al. | 252/8.55 C |
| 4,498,997 | 2/1985 | Walker | 252/8.55 C |
| 4,522,658 | 6/1985 | Walker | 148/6.14 R |
| 4,552,672 | 11/1985 | Walker | 252/8.55 C |
| 4,734,259 | 3/1988 | Frenier et al. | 422/16 |
| 4,888,121 | 12/1989 | Dill et al. | 252/8.553 |
| 5,120,471 | 6/1992 | Jasinski et al. | 252/389.54 |

OTHER PUBLICATIONS

U.S. Patent Application Serial No. 07/608,877 filed Nov. 5, 1990 on behalf of Michael L. Walker.

*Primary Examiner*—Sharon Gibson
*Assistant Examiner*—Valerie Fee
*Attorney, Agent, or Firm*—Robert A. Kent

[57] ABSTRACT

The present invention provides corrosion inhibiting compositions and methods whereby protective coatings are formed on metal surfaces. The compositions are basically comprised of a corrosion inhibiting condensation reaction product enhanced by the presence of antimony or bismuth compounds.

10 Claims, No Drawings

५,५९१,३८१

CORROSION INHIBITING COMPOSITIONS AND METHODS

This is a continuation of application Ser. No. 07/965,106 filed on Oct. 22, 1992, now abandoned.

BACKGROUND OF THE INVENTION

1. Field of the Invention.

This invention relates generally to corrosion inhibiting compositions and methods, and more particularly, to corrosion inhibiting compositions which form protective coatings on metal surfaces to inhibit the corrosive effects of oxidative environments in contact therewith.

2. Description of the Prior Art.

The corrosion of metal surfaces occurs when the surfaces are contacted by oxidative environments. Examples of such oxidative environments which are often in contact with metal surfaces include environments containing acids such as hydrochloric acid, nitric acid and sulfuric acid, environments containing water vapor in the presence of air or oxygen and environments associated with chloride or bromide ions, carbon dioxide and hydrogen sulfide.

Metal surfaces of tubular goods, heat exchangers and a variety of other equipment are often exposed to oxidative environments in industries such as the oil and chemical industries. For example, in the stimulation of oil and/or gas wells, aqueous solutions containing acids and/or other corrosive compounds are commonly utilized. When such fluids contact the metal surfaces of mixing tanks, pumps, casing, tubing and the like, the metal surfaces can be substantially corroded. Also, corrosive fluids are often produced from subterranean formations, e.g., brine, carbon dioxide and hydrogen sulfide, which can cause corrosion damage to metal surfaces in production and processing equipment. The corrosion of metal surfaces is increased when the surfaces are contacted by oxidative environments under elevated temperature and pressure conditions.

While a variety of corrosion inhibiting compositions and methods have been developed and used heretofore, there is a continuing need for improved corrosion inhibiting compositions and methods which are effective at high temperature and pressure conditions, are relatively inexpensive to produce and use and which provide residual protection for extended periods of time.

SUMMARY OF THE INVENTION

By the present invention improved corrosion inhibiting compositions and methods are provided which meet the needs described above and overcome the shortcomings of the prior art.

The compositions of the invention form protective coatings on metal surfaces whereby oxidative environment corrosion is thereafter strongly inhibited. The compositions are basically comprised of a corrosion inhibiting and metal surface coating condensation reaction product and a corrosion enhancing or intensifying metal compound selected from the group consisting of antimony compounds, bismuth compounds and mixtures thereof. The corrosion inhibiting reaction product is formed by reacting, in the presence of an aqueous base catalyst, a group (i) constituent which is selected from the group consisting of one or more compounds having a carbonyl group attached to at least one carbon atom which has at least one hydrogen atom also attached thereto, a group (ii) constituent which is selected from the group consisting of one or more aldehydes and a group (iii) constituent which is selected from the group consisting of one or more fatty compounds having from about 5 to about 60 carbon atoms, one or more alkyl nitrogen heterocyclic compounds including at least one alkyl group of from 1 to about 18 carbon atoms and having 3 to about 9 carbon atoms in the heterocyclic ring structure and mixtures of such fatty compounds and heterocyclic compounds. The group (i), (ii) and (iii) constituents are preferably different compounds or different mixtures of compounds.

The metal compound selected from the group consisting of antimony compounds, bismuth compounds and mixtures thereof is combined with the reaction product in an amount sufficient to enhance the corrosion inhibiting performance of the reaction product, generally an amount sufficient to provide a weight ratio of reaction product to metal compound, respectively, in the range of from about 1:8 to about 15:1.

The corrosion inhibiting composition can include an additional component selected from the group consisting of quaternary ammonium compounds and aromatic hydrocarbons having high oil wetting characteristics, and the composition can be dissolved or dispersed in an aqueous liquid carrier, e.g., an aqueous acid solution. Also, one or more surfactants for facilitating the dispersion of the composition in the aqueous carrier liquid can be included.

The methods of the invention basically comprise contacting one or more metal surfaces with a corrosion inhibiting composition of this invention at a temperature and for a time period sufficient to form a protective coating on the metal surface.

It is, therefore, a general object of the present invention to provide improved corrosion inhibiting compositions and methods.

Other and further objects, features and advantages of the present invention will be readily apparent to those skilled in the art from a reading of the description of preferred embodiments which follows.

DESCRIPTION OF PREFERRED EMBODIMENTS

The corrosion inhibiting compositions of this invention which form protective coatings on metal surfaces when contacted therewith are comprised of a corrosion inhibiting and metal surface coating reaction product prepared by reacting a plurality of constituents under basic conditions combined with a metal compound selected from the group consisting of antimony compounds, bismuth compounds and mixtures of such compounds. The antimony and/or bismuth metals in combination with the reaction product enhance the corrosion inhibition produced by the reaction product. The compositions or solutions or dispersions thereof in aqueous carrier liquids are brought into contact with metal surfaces to be protected at temperatures and for periods of time sufficient to form protective coatings on the metal surfaces.

Any metal surface subjected to an oxidative environment can be protected in accordance with this invention including surfaces comprised of ferrous metals, low alloy metals (e.g., N-80 Grade), stainless steel (e.g., 13Cr), copper alloys, brass, nickel alloys, duplex stainless steel alloys and the like. The compositions and methods of this invention are particularly suitable for protecting the external and internal metal surfaces of tubular goods, mixing tanks, pumps, conduits and other equipment used in association with processes for producing or enhancing the production of hydrocarbons from subterranean formations. The invention is particularly applicable to the protection of ferrous metal surfaces.

The term "oxidative environments" is used herein to describe various metal surface corrosive environments from which metal surfaces are protected by the corrosion inhibiting compositions and methods of this invention, e.g., corrosive acids such as hydrochloric acid, nitric acid and sulfuric acid, environments containing air or oxygen in combination with water vapor and environments associated with chloride or bromide ions, carbon dioxide and hydrogen sulfide. The protective coating formed on metal surfaces in accordance with the present invention strongly inhibits the corrosive effects on the surfaces (loss of metal and pitting) caused by such environments.

The reaction product mentioned above which is a major component of the corrosion inhibiting compositions of this invention is prepared by reacting the following constituents under basic conditions: (a) a group (i) constituent which is selected from the group consisting of one or more compounds having a carbonyl group attached to at least one carbon atom which has at least one hydrogen atom also attached thereto; (b) a group (ii) constituent which is selected from the group consisting of one or more aldehydes; and (c) a group (iii) constituent which is selected from the group consisting of one or more fatty compounds having from about 5 to about 60 carbon atoms, one or more alkyl _nitrogen heterocyclic compounds including at least one alkyl group of from 1 to about 18 carbon atoms and having 3 to about 9 carbon atoms in the heterocyclic ring structure and mixtures of such fatty compounds and heterocyclic compounds. It is preferred and the best results are obtained when the groups (i), (ii) and (iii) constituents are different compounds or different mixtures of compounds.

The group (i) constituent is preferably present in the reaction mixture in an amount in the range of from about 2 to about 7 equivalents, the group (ii) constituent is preferably present in an amount in the range of from about 2 to about 20 equivalents and the group (iii) constituent is preferably present in the range of from about 0.2 to about 3 equivalents. The term "equivalent" is used herein to mean the number of moles of a compound or compounds that are present times the number of reactive sites on the compound or compounds under the conditions of the reaction.

The group (i) constituent which includes one or more compounds having a carbonyl group attached to at least one carbon atom which has at least one hydrogen atom also attached thereto includes aliphatic and aryl substituted aliphatic aldehydes, aliphatic and aryl substituted aliphatic ketones and mixtures thereof such as, for example, acetophenone, mesityl oxide, 1-acetonaphthone, p-methoxyacetophenone, propiophenone, p-chloroacetophenone, isophorone, tetrolophenone, 2,4-pentanedione, a mixture of phenethyl alcohol and acetophenone, 2-acetylcyclohexanone, 2-acetonaphthone, 2-thienylketone, methyl isobutylketone, n-butyrophenone, acetone, 3,4-dihydro-l-(2H)-naphthalenone, 2-heptanone, diacetone alcohol, undecanone-2, and the like.

Preferably, the carbonyl compound or compounds forming the group (i) constituent are selected from the group consisting of aromatic substituted aldehydes, aromatic substituted ketones and aliphatic ketones, more preferably from the group consisting of aromatic substituted aldehydes and aromatic substituted ketones. Most preferably the group (i) constituent is an aromatic substituted ketone such as acetophenone.

The group (ii) constituent used in preparing the reaction product are aldehydes having from 1 to 16 or more carbon atoms including formaldehyde, benzaldehyde, heptanal, propanal, hexanal, octanal, decanal, hexadecanal, cinnamaldehyde and the like. Aldehyde generating materials under the conditions of the reaction such as paraformaldehyde, urotropin new, paraldehyde, acetals, hemiacetals, sulfite addition products and the like. Preferably the aldehydes forming the group (ii) constituent used in preparing the condensation product are aliphatic aldehydes. Most preferably the aldehyde is formaldehyde.

The group (iii) constituent includes one or more fatty compounds having from about 5 to about 60 carbon atoms or one or more alkyl nitrogen heterocyclic compounds including at least one alkyl group of from 1 to about 18 carbon atoms and having three to about 9 carbon atoms in the heterocyclic ring structure, or mixtures of such fatty compounds and heterocyclic compounds. Examples of useful fatty compounds include alkyl carboxylic acids, amines, amides and alcohols having from about 5 to about 60 carbon atoms as well as olefinic carboxylic acids having from about 5 to about 60 carbon atoms and having one or more unsaturated sites along the chain. In addition, various alkylene oxide adducts of the above fatty compounds have been found effective. Thus, the group (iii) constituent can include rendered animal fat, octanoic acid, myristic acid, pelargonic acid, abietic acid, lauric acid, oleic acid, caprylic acid, tall oil acid, ethoxylated coco fatty acid, ethoxylated oleic acid, ethoxylated rosin fatty acid, tall oil reacted with various quantities of propylene oxide and ethylene oxide, and the like. As used herein, the term "fatty" refers to the length of the carbon chain which should consist of at least about 5 carbon atoms. The degree of saturation or unsaturation of the fatty compound is unimportant so long as any substituents present do not cause unwanted side reactions.

In addition to one or more fatty compounds as described above, the group (iii) constituents can include one or more alkyl nitrogen heterocyclic compounds which include at least one alkyl group of from 1 to about 18 carbon atoms and which have 3 to about 9 carbon atoms in the heterocyclic ring structure. Examples of such compounds include 2-methyl pyridine, 4-methyl pyridine, 2-methyl quinoline, 4-methyl quinoline, other alkyl pyridines and quinolines and the like. Alkyl nitrogen heterocyclic compounds which are 2 or 4 alkyl substituted are generally preferred. Preferably, the compound or compounds forming the group (iii) constituent are selected from the group consisting of carboxylic acids, ethoxylated carboxylic acids, amides and ethoxylated amides. More preferably the group (iii) constituent is selected from the group consisting of carboxylic acids and ethoxylated carboxylic acids. Most preferably, the group (iii) constituent is a carboxylic acid such as oleic acid.

The reaction of the above described constituents must be carried out under basic conditions to form the reaction product, e.g., in the presence of a relatively strongly basic aqueous solution. Suitable bases which can be used are sodium hydroxide, potassium hydroxide and the like. Amine bases and sodium and potassium carbonate can also be utilized. The base is generally included in an aqueous solution thereof in a concentration in the range of from about 15% to about 30% by weight of the solution. The temperature at which the reaction constituents are reacted to form the condensation product is preferably in the range of from about 100° F. to about 300° F. The duration of the reaction is generally about 4 to about 48 hours, although longer reaction times can be utilized. Upon completion of the reaction additional group (iii) constituents can be added to the reacted components with stirring to bring the level of such constituents to within the aforementioned equivalents range.

The antimony and/or bismuth compound or compounds which are useful in the corrosion inhibiting compositions of this invention are those antimony and bismuth compounds capable of activation by the reaction product to enhance the degree of inhibition of corrosion of a metal surface achieved by the reaction product. Antimony or bismuth compounds alone do not significantly inhibit the corrosive effects of oxidated environments on metal surfaces. However, when certain antimony and/or bismuth compounds are combined with the reaction product, they are activated by the reaction product and substantially enhance the corrosion inhibiting ability of the reaction product. As used herein, antimony or bismuth compounds that are "activated" by the reaction product are antimony or bismuth compounds that are made more active by the reaction product in inhibiting corrosion of metal surfaces in contact therewith, and in combination with the reaction product achieve a level of corrosion inhibition beyond that which is achievable by the reaction product alone. The antimony and/or bismuth compounds used in the corrosion inhibiting compositions are preferably water soluble in aqueous base solutions under the conditions at which the corrosion inhibiting compositions are utilized.

It is believed that the reaction product mitigates corrosion and inhibits the formation of hydrogen gas from hydrogen ions generated by reaction of the coating composition with metal surfaces. This allows antimony and/or bismuth ions to diffuse to the metal surface where they are reduced in the vicinity thereof by hydrogen atoms and slowly form a uniform, tight, non-porous coating on metal surfaces. In the absence of the reaction product, a coating composition containing antimony or bismuth compounds reacts too quickly with metal surfaces causing a relatively high rate of diffusion of iron away from the metal surfaces. Hydrogen gas is formed from the hydrogen ions and also diffuses at a relatively high rate away from the metal surfaces. Such diffusion of iron and hydrogen prevents antimony and/or bismuth ions from effectively diffusing to the surface and being reduced by hydrogen atoms in the vicinity thereof.

It is necessary for the coating composition to have a pH below about 3 in order to obtain hydrogen ions which reduce the antimony and/or bismuth ions. The pH of the coating composition can be adjusted by the addition of one or more acids and/or bases thereto. Suitable acids include inorganic acids such as hydrochloric acid, organic acids such as acidic acid, formic acid and glycolic acid and mixtures thereof.

Examples of antimony compounds that can be employed include antimony oxide compounds such as antimony trioxide, antimony tetraoxide, and antimony pentoxide, antimony halide compounds such as antimony trichloride, antimony pentachloride, antimony trifluoride and antimony pentafluoride, antimony tartrate, antimony citrate, alkali metal salts of antimony tartrate and antimony citrate, potassium pyroantimonate and other alkali metal salts thereof, antimony adducts of ethylene glycol and other similar antimony compounds. Preferably, the antimony compound or compounds employed are selected from the group consisting of antimony oxides, antimony halides and antimony adducts of ethylene glycol. Most preferably, the antimony compound is an antimony adduct of ethylene glycol.

Examples of bismuth compounds that can be employed include bismuth oxide compounds such as bismuth trioxide, bismuth tetraoxide and bismuth pentaoxide, bismuth halides such as bismuth trichloride, bismuth tribromide and bismuth triiodide, bismuth tartrate, bismuth citrate, alkali metal salts of bismuth tartrate and bismuth citrate, bismuth oxyhalogens and other similar bismuth compounds. The most preferred bismuth compound or compounds are bismuth oxides.

The above described reaction product and metal compound or compounds are preferably present in the corrosion inhibiting compositions of this invention in a weight ratio, respectively, in the range of from about 1:8 to about 15:1, most preferably in a weight ratio of about 2:1.

In most applications, it is advantageous to combine the corrosion inhibiting compositions of this invention with aqueous liquid carriers. The aqueous liquid carrier can be any aqueous solution which does not adversely react with the components of the corrosion inhibiting composition used. The pH of the corrosion inhibiting composition generally corresponds to the pH of the aqueous liquid carrier used, and therefore, the aqueous liquid carrier should have a pH below about 3. In formation acidizing and acid cleaning applications, the aqueous liquid carrier is generally an aqueous acid solution comprising water and one or more strong mineral acids such as hydrochloric acid. When the aqueous liquid carrier is not an acid solution, the pH of the aqueous liquid carrier containing a corrosion inhibiting composition of this invention can be adjusted by the addition of one or more acids or bases thereto.

It is generally advantageous to combine additional compounds with the corrosion inhibiting compositions. That is, optional components such as dispersing agents, formic acid generating compounds, sources of copper ions, sources of iodide, aromatic hydrocarbons having high oil wetting characteristics, solvents, acetylenic alcohols other surfactants and mixtures thereof can be employed. Such additives can broaden the utility of the corrosion inhibiting compositions, enhance the effectiveness of the compositions and/or facilitate the use thereof.

Quaternary ammonium compounds can increase the level of inhibition of corrosion achieved by the corrosion inhibiting compositions in certain applications. Examples of quaternary ammonium compounds that can be added to the corrosion inhibiting compositions include aromatic nitrogen compounds such as alkylpyridine-N-methyl chloride, alkylpyridine-N-benzyl chloride, alkylquinoline-N-benzyl chloride, alkylisoquinoline quaternary compounds, benzoquinoline quaternary compounds, chloromethylnaphthalene quaternary compounds such as chloromethylnaphthyl quinolinium chloride and mixtures of the above compounds. The alkyl group associated with the pyridine compounds can contain from 1 to about 6 carbon atoms and the alkyl group associated with the quinoline compounds can contain from 1 to about 8 carbon atoms. When included, the quaternary ammonium compound is present in the corrosion inhibiting composition in a weight ratio to the reaction product therein in the range of from about 10:1 to about 1:10, preferably a weight ratio of about 2:1.

Aromatic hydrocarbons having high oil wetting characteristics can also increase the degree of inhibition of corrosion achieved by the inventive coating composition in certain applications. Substantially any aromatic hydrocarbon compound that exhibits high oil-wetting characteristics can be employed. Examples include xylenes, saturated biphenyl-xylene admixtures, heavy aromatic naphtha, tetralene, tetrahydroquinoline, tetrahydronaphthalene and the like.

A solvent such as an alkyl alcohol, glycol or mixtures thereof can be added to the coating compositions to assist the maintenance of the components of the compositions in homogeneous admixtures. Examples of alkyl alcohols and glycols that can be used include methyl alcohol, ethyl alcohol, propyl alcohol, isopropyl alcohol, butyl alcohol, pentyl alcohol, hexyl alcohol, heptyl alcohol, octyl alcohol, ethylene glycol, propylene glycol and higher liquid members of the group of aliphatic alcohols. Preferably, the alkyl alcohol and/or glycol is employed in an amount no greater than that which is sufficient to maintain the components as a homogenous admixture.

One or more dispersing surfactants can be included in the aqueous liquid carrier containing a corrosion inhibiting composition of this invention to facilitate the dispersion of the corrosion inhibiting composition in the liquid carrier. Due to their inert nature, nonionic surfactants are preferred examples of which include ethoxylated oleates, tall oils and ethoxylated fatty acids. Ethylene oxide adducts of octylphenol, nonylphenol, tridecylphenol and the like ethoxylated with from about 8 to about 20 moles of ethylene oxide per mole are preferred.

In preparing the corrosion inhibiting compositions of this invention, the reaction product and antimony and/or bismuth compounds are mixed in a weight ratio respectively, of from about 1:8 to about 15:1. When a quaternary ammonium compound is employed, e.g., chloromethylnaphthyl quinolinium chloride, it is added to the corrosion inhibiting composition in a weight ratio to the condensation product in the range of from about 1:10 to about 10:1.

When a corrosion inhibiting composition of this invention is combined with an aqueous liquid carrier, it is mixed therewith in an amount in the range of from about 1 to about 20 gallons, more preferably in the range of from about 5 to about 20 gallons, per 1000 gallons of aqueous liquid carrier. As will be understood by those skilled in the art, the particular quantity of corrosion inhibiting composition used in an aqueous liquid carrier depends upon the degree of inhibition of corrosion desired for the particular application, the nature of the liquid carrier, the temperature at which the contact is carried out and other known factors. The corrosion inhibiting compositions and the solutions or dispersions thereof in aqueous liquids can be prepared utilizing conventional mixing equipment.

When a corrosion inhibiting composition of this invention is combined with an aqueous liquid carrier, it is preferably present therein in an amount in the range of from about 0.1% to about 3%, more preferably from about 0.4% to about 2%, by weight based on the total weight of the aqueous liquid and corrosion inhibiting composition. Generally, however, little additional benefit is gained by using greater than about 3% by weight of the corrosion inhibiting composition in the aqueous liquid.

When an aqueous liquid carrier containing the corrosion inhibiting composition is employed, the quaternary ammonium compound, if utilized, can be added thereto in an amount in the range of from about 0.8% to about 4% by weight based on the total weight of the aqueous liquid and corrosion inhibiting composition. When an aromatic hydrocarbon compound is employed, it is preferably present in the aqueous liquid-corrosion inhibiting composition mixture in an amount in the range of from about 0.5% to about 40% by weight thereof. When a dispersing agent is employed for dispersing the corrosion inhibiting composition and other compounds in the aqueous liquid carrier, it is preferably present in an amount in the range of from about 1% to about 20% by weight of the aqueous liquid and corrosion inhibiting composition.

The methods of this invention basically comprise the steps of contacting a metal surface with a corrosion inhibiting composition described above at a temperature and for a time period sufficient to form a protective coating on the metal surface and inhibit the corrosion thereof. The metal surface to be protected can be contacted with a corrosion inhibiting composition of this invention in any manner that results in the formation of a surface deposit of the composition of the metal. For example, the metal surface can be contacted with the composition by immersing the metal surface in the composition or by flowing the composition across the surface. As mentioned above, the corrosion inhibiting compositions of this invention are usually dissolved or dispersed in an aqueous liquid carrier, and the aqueous liquid-corrosion inhibiting composition combination is brought into contact with the metal surface at a temperature and for a time period sufficient to form a protective coating thereon.

A metal surface to be protected is preferably contacted with a corrosion inhibiting composition of this invention for a time period ranging from about 15 minutes to over several hours at elevated temperatures. When the corrosion inhibiting composition is dissolved or dispersed in an aqueous liquid, a satisfactory protective coating is generally formed by flowing the aqueous liquid-corrosion inhibiting composition combination over the metal surface to be protected for a time period in the range of from about ½ to about 48 hours.

The temperature at which the metal surface is contacted with the coating composition can range from ambient temperature to about 500° F. and higher. Preferably, the temperature at which the metal surface is contacted with the corrosion inhibiting composition is in the range of from about 240° F. to about 450° F. In well acidizing and industrial cleaning applications, it is generally necessary and desirable to maintain the pH of the coating composition and the temperature thereof at relatively constant levels during the entire time metal surfaces are contacted with the corrosion inhibiting composition.

For example, the methods of this invention can be utilized to protect metal surfaces of tubular goods and other equipment associated with wells during treatments of subterranean formations with aqueous acid solutions to provide corrosion protection to the tubular goods and equipment during and subsequent to the treatments. In such an application, the aqueous liquid in which the corrosion inhibiting composition is dissolved or dispersed can be the acidizing treatment solution, e.g., a 15% by weight aqueous hydrochloric acid solution. The acid solution containing the coating composition is generally pumped through tubular goods disposed in the well bore and introduced into the subterranean formation to be acidized. The corrosion inhibiting composition in the acid solution forms a relatively uniform, relatively non-porous coating on the metal surfaces of the tubular goods and other metal equipment which it contacts thereby inhibiting the corrosion of the tubular goods during the acid treatment. The injected acid solution dissolves soluble materials within the subterranean formation whereby at least a portion of the acid in the solution is neutralized. The treating solution is then produced back by way of the tubular goods in the well bore for removal at the surface. The protective coating on the metal surfaces provided by the corrosion inhibiting composition of this invention protects the surfaces from corrosion during the treatment as well as afterwards when corrosive fluids are produced from the well, e.g., connate water along with carbon dioxide, hydrogen sulfide or the like.

Thus, the methods and corrosion inhibiting compositions of this invention provide uniform non-porous, non-corrosive protective coatings on metal surfaces to inhibit or prevent the corrosive effects of various oxidated environments on the metal surfaces. The specific reaction product and antimony or bismuth compound forming the corrosion inhibiting compositions synergistically function together to substantially reduce corrosion of metal surfaces. The corrosion inhibiting coating formed on the metal surfaces adheres thereto for relatively long periods of time, e.g., 12 months in some applications, and protects the metal surfaces against attack by a variety of oxidative environments in contact therewith.

In order to further illustrate the corrosion inhibiting compositions and methods of this invention, the following example is given.

EXAMPLE

A reaction product for use in preparing corrosion inhibiting compositions of this invention was prepared by reacting 0.28 moles (0.56 equivalents) of acetophenone, 0.87 moles (0.87 equivalents) of formaldehyde and 0.14 moles (0.28 equivalents) of oleic acid in the presence of about 0.88 moles of a 27% by weight aqueous solution of ammonium hydroxide. The reaction was carried out in a reaction vessel in which the reaction mixture was stirred and maintained under reflux conditions at a temperature of about 225° F. for about 16 hours. The condensation product formed a nonaqueous layer in the reaction vessel which was separated from the residue in the vessel upon cooling of the reaction mixture. Approximately 18 grams of nonylphenol ethoxylated with about 20 moles of ethylene oxide (a nonionic surfactant) were then added to the reaction product. The procedure described above was repeated and in addition, a quaternary aromatic ammonium compound was added to the condensation product-nonionic surfactant mixture. That is, about 95 grams of a 60% by weight aqueous solution of chloromethylnaphthal quinolinium chloride were added thereto.

Various test corrosion inhibiting compositions were next prepared by adding portions of the condensation product-surfactant mixtures described above along with equal amounts of antimony trioxide or bismuth trioxide to aqueous 15% by weight hydrochloric acid solutions. That is, to a first quantity of the 15% hydrochloric acid solution, a 1% by weight of acid solution amount of the reaction product-nonionic surfactant mixture described above was added. To a second test quantity of the hydrochloric acid solution, a 1% by weight amount of the reaction product-nonionic surfactant mixture and a 1% by weight amount of antimony trioxide were added. To a third quantity of the hydrochloric acid solution, a 1% by weight amount of the reaction product-nonionic surfactant mixture and a 1.9% by weight amount of bismuth trioxide were added. To a fourth quantity of the aqueous hydrochloric acid solution, a 1% by weight amount of the above described reaction product-nonionic surfactant-quaternary aromatic ammonium compound mixture was added. To a fifth quantity of the acid solution, a 1% by weight amount of the reaction product-nonionic surfactant-quaternary aromatic ammonium compound and a 1% by weight amount of antimony trioxide were added. To a sixth quantity of the aqueous hydrochloric acid solution, a 1% by weight amount of the reaction product-nonionic surfactant-quaternary aromatic ammonium compound and a 1.9% by weight amount of bismuth trioxide were added.

The six aqueous acid solutions containing the above described components were tested to determine the corrosion loss of API N80 steel when in contact therewith at 300° F. for 2 hours. That is, API N80 steel corrosion coupons were weighed and placed in the test acid solutions. The solutions were maintained at 300° F. for 2 hours under a 600 psig overpressure after which the coupons were removed, weighed and the corrosion losses of the coupons in lb/ft$^2$ were determined. The results of these tests are set forth in the Table below.

TABLE

| Corrosion Inhibiting Composition | | | |
| --- | --- | --- | --- |
| Condensation Product Mixture, % By Weight[1] | Antimony Trioxide, % By Weight[1] | Bismuth Trioxide, % By Weight[1] | Corrosion Loss, lb/sq ft. |
| 1[2] | — | — | 0.062 |
| 1[2] | 1 | — | 0.013 |
| 1[2] | — | 1.9 | 0.024 |
| 1[3] | — | — | 0.22 |
| 1[3] | 1 | — | 0.05 |
| 1[3] | — | 1.9 | 0.05 |

[1] % by weight of aqueous acid solution and condensation product.
[2] Product mixture includes 16 parts by weight of nonylphenol ethoxylated with about 20 moles of ethyleneoxide per part of condensation product.
[3] Product mixture includes 16 parts by weight or nonylphenol ethoxylated with about 20 moles of ethylene oxide per part of condensation product and 42 parts by weight of chloromethylnaphthyl quinolinium chloride per part of condensation product.

From the test results set forth above, it can be seen that the compositions of the present invention are effective in inhibiting corrosion.

Thus, the present invention is well adapted to carry out the objects and attain the ends and advantages mentioned as well as those which are inherent therein. While numerous changes may be made by those skilled in the art, such changes are encompassed within the spirit of this invention as defined by the appended claims.

What is claimed is:

1. A corrosion inhibiting composition which forms a protective coating on a metal surface when said metal surface is contacted therewith comprising:

a condensation product consisting essentially of a product prepared by reacting, in the presence of an aqueous base catalyst and at a reaction temperature in the range of from about 100° F. to about 300° F. for from about 4 to about 48 hours, from about 2 to about 7 equivalents of a group (i) constituent selected from the group consisting of acetophenone, mesityl oxide, 1-acetonaphthone, p-methoxyacetophenone, propiophenone, p-chloroacetophenone, isophorone, tetrolophenone, 2,4-pentanedione, a mixture of phenethyl alcohol and acetophenone, 2-acetylcyclohexanone, 2-acetonaphthone, 2-thienylketone, methyl isobutylketone, n-butyrophenone, acetone, 3,4-dihydro-1-(2H)-naphthalenone, 2-heptanone, diacetone alcohol, undecanone-2, and mixtures thereof, from about 2 to about 20 equivalents of a group (ii) constituent selected from the group consisting of formaldehyde, benzaldehyde, heptanal, propanal, hexanal, octanal, decanal, hexadecanal, cinnamaldehyde, aldehyde generating materials selected from the group consisting of paraformaldehyde, urotropin new, paraldehyde, acetals, hemiacetals and sulfite addition products, and mixtures thereof, and from about 0.2 to about 3 equivalents of a group (iii) constituent selected from the group consisting of rendered animal fat, octanoic acid, myristic acid, pelargonic acid, abietic acid, lauric acid, oleic acid, caprylic acid, tall oil acid, ethoxylated coco, fatty acid, ethoxylated oleic acid, ethoxylated rosin fatty acid, tall oil reacted with propylene oxide and ethylene oxide, 2-methyl pyridine, 4-methyl pyridine, 2-methyl quinoline, 4-methyl quinoline, and mixtures thereof;, a metal compound selected from the group consisting of antimony compounds selected from the group consisting of antimony oxides, antimony halides, antimony tartrate, antimony citrate, alkali metal salts of antimony tartrate and antimony citrate, alkali metal salts of pyroantimonate, antimony adducts of ethylene glycol and mixtures thereof, bismuth compounds selected from the group consisting of bismuth oxides, bismuth halides, bismuth tartrate, bismuth citrate, alkali metal salts of bismuth tartrate and bismuth citrate, bismuth oxyhalogens, and mixtures thereof, and mixtures of said antimony compounds and said bismuth compounds; and an aqueous liquid carrier in which said condensation product and said metal compound are dispersed or dissolved, wherein said condensation product and said metal compound are present in said composition in a condensation product to metal compound weight ratio in the range of from about 1:8 to about 15:1 and wherein none of said constituents is substantially identical to either of the other of said constituents.

2. The composition of claim 1 wherein said group (i) constituent is acetophenone, said group (ii) constituent is formaldehyde, said group (iii) constituent is oleic acid, and said aqueous base catalyst is an aqueous ammonium hydroxide solution.

3. The composition of claim 1 wherein said metal compound is an antimony adduct of ethylene glycol.

4. A corrosion inhibiting composition which forms a protective coating on a metal surface when contacted therewith comprising:

a condensation product consisting essentially of a product prepared by reacting, in the presence of an aqueous base catalyst and at a reaction temperature in the range of from about 100° F. to about 300° F. for from about 4 to about 48 hours, from about 2 to about 7 equivalents of a group (i) constituent selected from the group consisting of acetophenone, mesityl oxide, 1-acetonaphthone, p-methoxyacetophenone, propiophenone, p-chloroacetophenone, isophorone, tetrolophenone, 2,4-pentanedione, a mixture of phenethyl alcohol and acetophenone, 2-acetylcyclohexanone, 2-acetonaphthone, 2-thienylketone, methyl isobutylketone, n-butyrophenone, acetone, 3,4-dihydro-1-(2H)-naphthalenone, 2-heptanone, diacetone alcohol, undecanone-2, and mixtures thereof, from about 2 to about 20 equivalents of a group (ii) constituent selected from the group consisting of formaldehyde, benzaldehyde, heptanal, propanal, hexanal, octanal, decanal, hexadecanal, cinnamaldehyde, aldehyde generating materials selected from the group consisting of paraformaldehyde, urotropin new, paraldehyde, acetals, hemiacetals and sulfite addition products, and mixtures thereof, and from about 0.2 to about 3 equivalents of a group (iii) constituent selected from the group consisting of alkyl nitrogen heterocyclic compounds and mixtures thereof, said alkyl nitrogen heterocyclic compounds being compounds which include at least one alkyl group having from 1 to about 18 carbon atoms and which include a heterocyclic ring structure having from 3 to about 9 carbon atoms;

a metal compound selected from the group consisting of antimony compounds selected from the group consisting of antimony oxides, antimony halides, antimony tartrate, antimony citrate, alkali metal salts of antimony tartrate and antimony citrate, alkali metal salts of pyroantimonate, antimony adducts of ethylene glycol and mixtures thereof, bismuth compounds selected from the group consisting of bismuth oxides, bismuth halides, bismuth tartrate, bismuth citrate, alkali metal salts of bismuth tartrate and bismuth citrate, bismuth oxyhalogens, and mixtures thereof, and mixtures of said antimony compounds and said bismuth compounds; and an aqueous liquid carrier in which said condensation product and said metal compound are dispersed or dissolved, wherein said condensation product and said metal compound are present in said composition in a condensation product to metal compound weight ratio in the range of from about 1:8 to about 15:1 and wherein none of said constituents is substantially identical to either of the other of said constituents.

5. A method of inhibiting the corrosion of a metal surface comprising contacting said metal surface with a corrosion inhibiting composition at a temperature and for a time period sufficient to form a protective coating on said metal surface, said corrosion inhibiting composition comprising:

a condensation product consisting essentially of a product prepared by reacting, in the presence of an aqueous base catalyst and at a reaction temperature in the range of from about 100° F. to about 300° F. for from about 4 to about 48 hours, from about 2 to about 7 equivalents of a group (i) constituent selected from the group consisting of acetophenone, mesityl oxide, 1-acetonaphthone, p-methoxyacetophenone, propiophenone, p-chloroacetophenone, isophorone, tetrolophenone, 2,4-pentanedione, a mixture of phenethyl alcohol and acetophenone, 2-acetylcyclohexanone, 2-acetonaphthone, 2-thienylketone, methyl isobutylketone, n-butyrophenone, acetone, 3,4-dihydro-1-(2H)-naphthalenone, 2-heptanone, diacetone alcohol, undecanone-2, and mixtures thereof, from about 2 to about 20 equivalents of a group (ii) constituent selected from the group consisting of formaldehyde, benzaldehyde, heptanal, propanal, hexanal, octanal, decanal, hexadecanal, cinnamaldehyde, aldehyde generating materials selected from the group consisting of paraformaldehyde, urotropin new, paraldehyde, acetals, hemiacetals and sulfite addition products, and mixtures thereof, and from about 0.2 to about 3 equivalents of a group (iii) constituent selected from the group consisting of rendered animal fat, octanoic acid, myristic acid, pelargonic acid, abietic acid, lauric acid, oleic acid, caprylic acid, tall oil acid, ethoxylated coco fatty acid, ethoxylated oleic acid, ethoxylated rosin fatty acid, tall oil reacted with propylene oxide and ethylene oxide, 2-methyl pyridine, 4-methyl pyridine, 2-methyl quinoline, 4-methyl quinoline, and mixtures thereof;

a metal compound selected from the group consisting of antimony compounds selected from the group consisting of antimony oxides, antimony halides, antimony tartrate, antimony citrate, alkali metal salts of antimony tartrate and antimony citrate, alkali metal salts of pyroantimonate, antimony adducts of ethylene glycol and mixtures thereof, bismuth compounds selected from the group consisting of bismuth oxides, bismuth halides, bismuth tartrate, bismuth citrate, alkali metal salts of bismuth tartrate and bismuth citrate, bismuth oxyhalogens, and mixtures thereof, and mixtures of said antimony compounds and said bismuth compounds; and an aqueous liquid carrier in which said condensation product and said metal compound are dispersed or dissolved, wherein said condensation product and said metal compound are present in said composition in a condensation product to metal compound weight ratio in the range of from about 1:8 to about 15:1 and wherein none of said constituents is substantially identical to either of the other of said constituents.

6. The method of claim 5 wherein said group (i) constituent is acetophenone, said group (ii) constituent is formaldehyde, said group (iii) constituent is oleic acid, and said aqueous base catalyst is an aqueous ammonium hydroxide solution.

7. The method of claim 5 wherein said group (iii) constituent is 2-methyl pyridine, 4-methyl pyridine, 2-methyl quinoline, 4-methyl quinoline, or a mixture thereof.

8. The method of claim 5 wherein said metal compound is an antimony adduct of ethylene glycol.

9. The method of claim 5 wherein said metal surface is a low alloy metal surface.

10. The method of claim 5 wherein said metal surface is an API N80 steel surface.

* * * * *

UNITED STATES PATENT AND TRADEMARK OFFICE
CERTIFICATE OF CORRECTION

PATENT NO. : 5,591,381
DATED : January 7, 1997
INVENTOR(S) : Michael L. Walker

It is certified that error appears in the above-identified patent and that said Letters Patent is hereby corrected as shown below:

Column 10, Claim 1, Line 66, after the word "coco" delete --,--.

Signed and Sealed this

Sixth Day of January, 1998

Attest:

Attesting Officer

BRUCE LEHMAN
Commissioner of Patents and Trademarks